(12) United States Patent
Tiberghien

(10) Patent No.: US 7,147,206 B2
(45) Date of Patent: Dec. 12, 2006

(54) QUICK CONNECT COUPLING INCLUDING MALE AND FEMALE ELEMENTS

(75) Inventor: Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 21 days.

(21) Appl. No.: 11/043,412

(22) Filed: Jan. 27, 2005

(65) Prior Publication Data

US 2005/0194556 A1 Sep. 8, 2005

(30) Foreign Application Priority Data

Feb. 2, 2004 (FR) .................................. 04 00962

(51) Int. Cl.
*F16L 29/00* (2006.01)
(52) U.S. Cl. ..................... 251/149.1; 251/148
(58) Field of Classification Search ................ 251/148, 251/149.1, 149.6, 149.7; 141/348, 349
See application file for complete search history.

(56) References Cited

U.S. PATENT DOCUMENTS

| | | | |
|---|---|---|---|
| 4,745,948 A | 5/1988 | Varasso | |
| 6,279,874 B1 * | 8/2001 | Nyberg | 251/149.6 |
| 6,705,592 B1 * | 3/2004 | Hullegien et al. | 251/149.6 |
| 6,883,542 B1 * | 4/2005 | Kuraguchi et al. | 137/613 |

FOREIGN PATENT DOCUMENTS

| | | |
|---|---|---|
| DE | 201 18 143 | 2/2003 |
| EP | 0 969 239 | 6/1999 |
| FR | 1 405 726 | 7/1965 |
| GB | 732 186 | 6/1955 |
| GB | 979 821 | 1/1965 |

* cited by examiner

*Primary Examiner*—J. Casimer Jacyna
(74) *Attorney, Agent, or Firm*—Dowell & Dowell

(57) ABSTRACT

A quick connect coupling includes male and female elements of which one includes a closure valve that is spaced inwardly from an open end of the one element and that is opened by engagement of the other element after a portion of the other element passes through an annular opening in the one element. To prevent accidental opening of the valve, a ratio of a radial width of the annular opening and a depth of the annular opening between the valve and an entrance into the annular opening is less that 1.

15 Claims, 2 Drawing Sheets

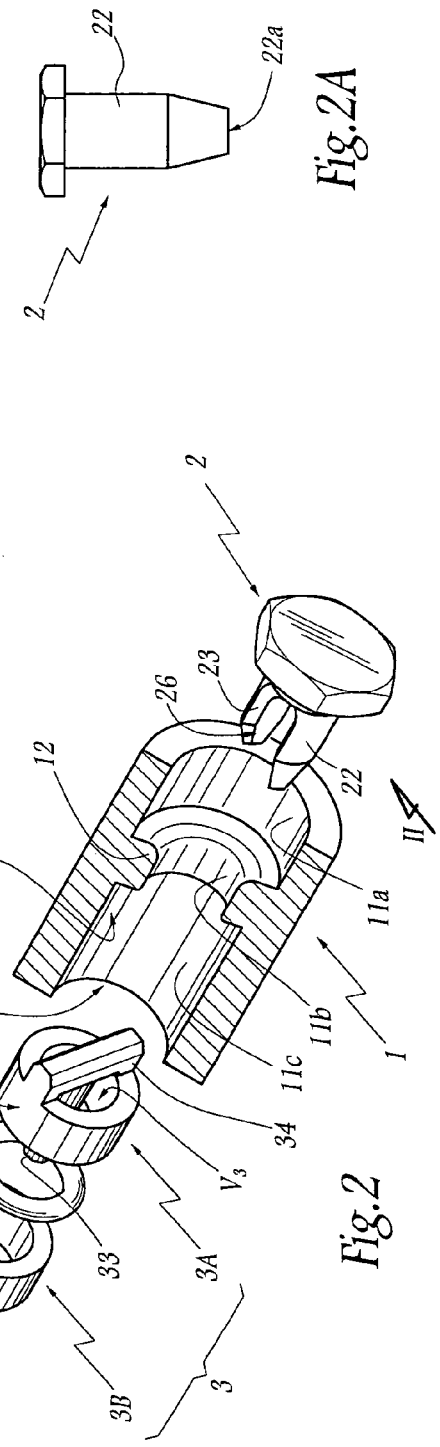
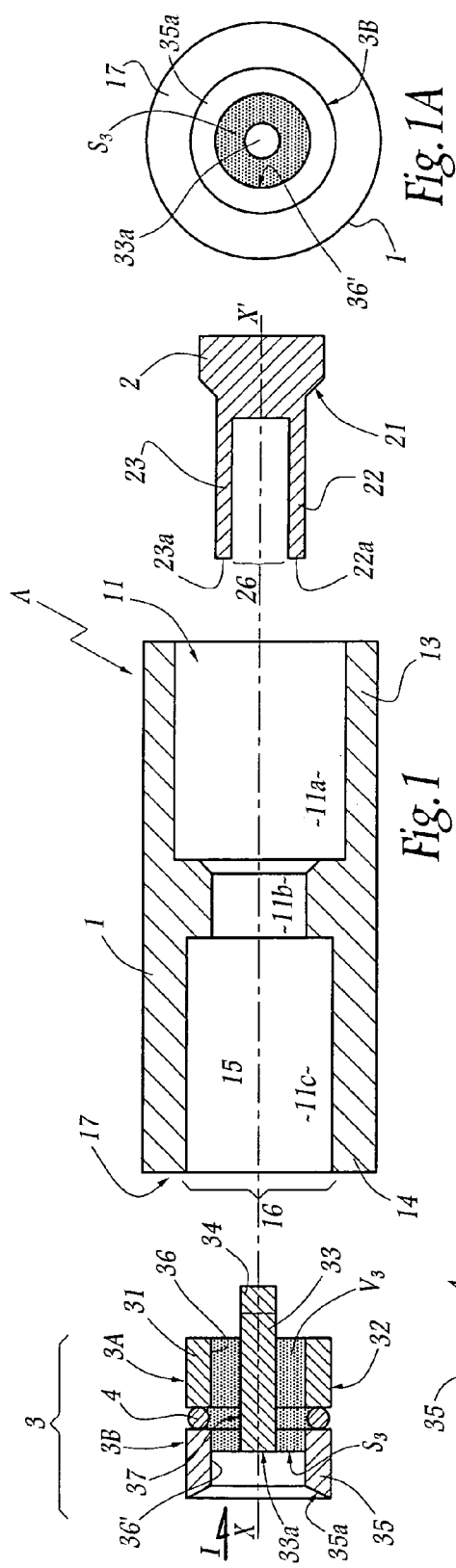

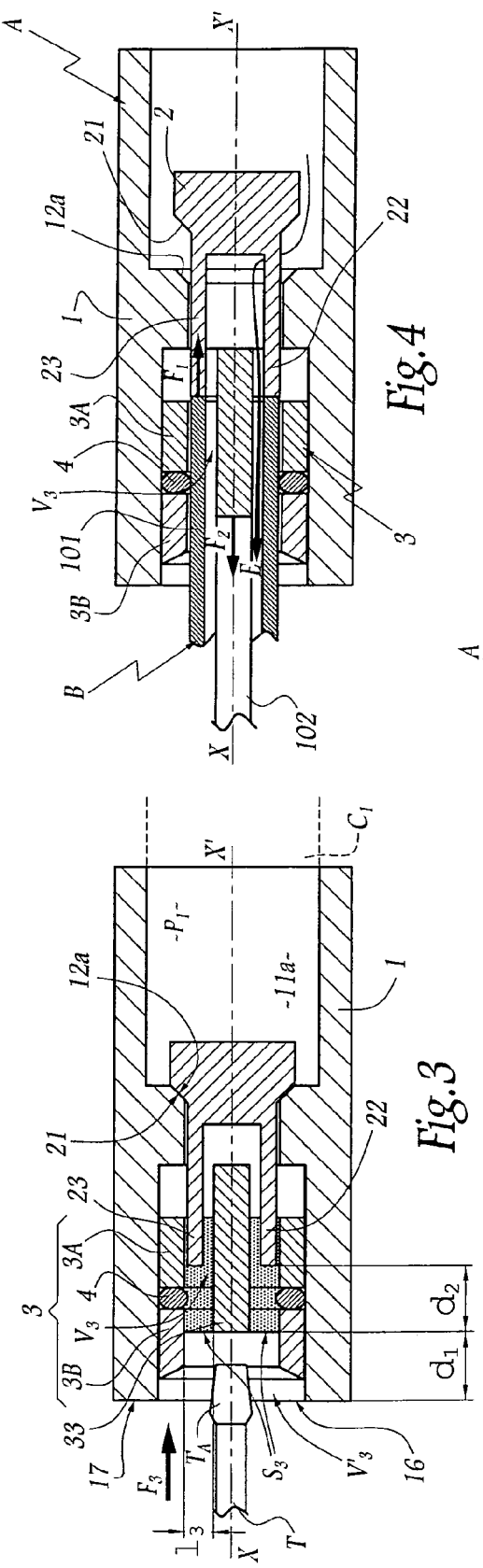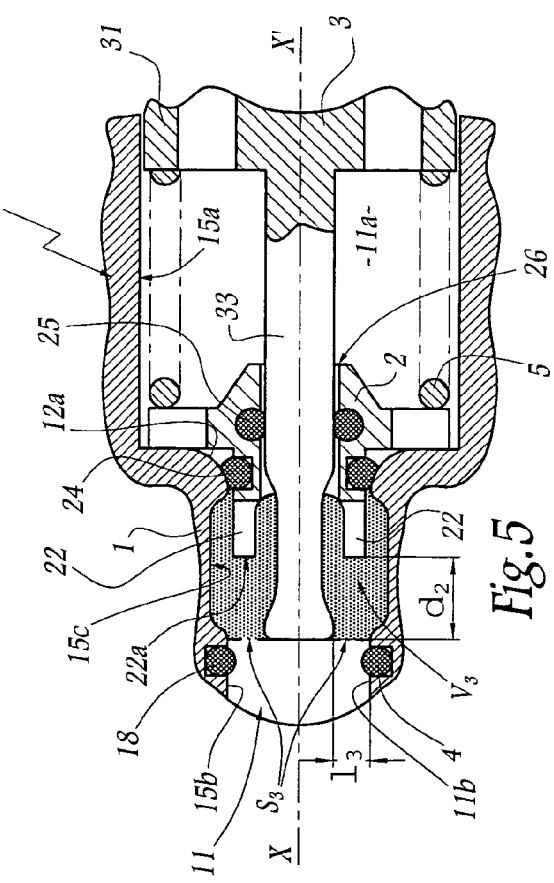

QUICK CONNECT COUPLING INCLUDING MALE AND FEMALE ELEMENTS

BACKGROUND OF THE INVENTION

The present invention relates to a male or female element of a quick connection, as well as to a quick connection comprising, inter alia, such an element.

DESCRIPTION OF THE RELATED ART

In the field of handling fluid under pressure, it is known, for example from EP-A-0 969 239, to equip each of the male and female elements of a quick connection with a closure valve controlled by the other element of the connection, with the result that the fit of the elements of the connection in each other induces an opening of the valves. This type of connection gives satisfaction in the majority of cases and, to a large extent, limits the risks of leakage during the successive openings/closures of the connection. However, when the male and female elements of the connection are disconnected, the valve is flush with a pusher which it surrounds and an effort exerted accidentally on the exposed face of the valve of one of these elements may move it away from its seat, with the result that a risk of leakage cannot be excluded.

It is also known from GB-A-732 186 to equip the valve of a female element of a quick connection with a rod on which is mounted a washer supporting a seal which receives the end of a male connector in abutment. An accidental or fraudulent abutment on the end of the rod may result in an untimely opening of the valve, while the seal is only slightly recessed with respect to the front end of the rod, with the result that it risks being struck or displaced during an operation other than the positioning of the male connector.

It is also known from GB-A-979 821 to use a valve whose front face is flush with that of a pusher that this front face surrounds. This front face is easily accessible, with the result that the risks of accidental or fraudulent manipulation of the valve in the sense of opening it cannot be excluded.

Now, in certain applications, dangerous fluids may circulate in a connection. For example, hydrogen may be circulated in a low-pressure system for supplying fuel cells from a reservoir. In such case, it is essential to avoid accidentally opening of the valve of one of the elements of the connection when these elements are uncoupled.

It is an object of the invention to attain this object by providing a novel connection element of which the valve does not risk being opened accidentally in uncoupled configuration.

SUMMARY OF THE INVENTION

In that spirit, the invention relates to a male or female element of a safety quick connection intended for removably joining pipes and/or reservoirs of fluid under pressure, this element being equipped with a closure valve intended to be opened by the other element of the connection, while, when the valve is in abutment on its seat, at least one surface of the valve, intended to receive a part of the other element of the connection in abutment to to open it, is disposed recessed with respect to an annular transverse section or opening for passage of the aforementioned part of the other element for engaging the valve to open it. This element is characterized in that a ratio of a mean width of the annular opening, taken in a radial direction with respect to an axis of fit of the elements of the connection, and of a depth of recess of the or each bearing surface is less than 1, and preferably less than 0.3.

Within the meaning of the present invention, an annular section or volume is a cylindrical section, opening or volume with circular, virtually circular or polygonal base which does not extend to its central axis.

With the invention, the annular transverse section limits access to the volume in which the second element of the connection interacts with the valve. The value of the ratio between the mean width of the annular section and the depth of the recess of the or each bearing surface of the valve is such that these surfaces may be considered as being driven in deeply with respect to the width of the surface through which access is possible. The probabilities of a conventional object pressing against the or each surface of the valve, which are recessed, are therefore very low with respect to known devices.

According to advantageous but non-obligatory aspects of the invention, a quick connection element will have one or more of the characteristics set forth below.

Part of the valve which forms the bearing surface or surfaces is constituted by at least two portions separated from one another, with the result that they form a discontinuous bearing surface. The segmentation of the bearing surface limits the possibilities of movement insofar as the penetration of an object in the globally annular volume has little chance of inducing a force to open the valve.

When the valve is in abutment on its seat, the bearing surface or surfaces of the valve are disposed in an annular volume, inside the element in question, and of which the aforementioned transverse section constitutes an entrance.

The annular section, and possibly volume, are defined between a central stud whose median axis is substantially parallel to the direction of fit of the elements of the connection, and a continuous cylindrical surface. This central stud may project beyond the bearing surfaces, in a direction of a mouth of the element and inside a body thereof.

The ratio of the area of the bearing surface or of the sum of the areas of the bearing surfaces of the valve and of the area of the transverse section is always less than 1, and preferably less than 0.3.

The annular section is formed in the body of the element, at a distance from its mouth.

The annular section is defined, at least in part, by a member added in a conduit located between the valve and the mouth of this element. In a variant, the aforementioned member extends both upstream and downstream of the valve, while the valve is provided with an opening in which a part of this member is introduced, this allowing the valve to slide around this part. In addition, this member advantageously includes an annular part adapted to come into abutment against an internal surface of the body of the element, and a stud adapted to be centered on the axis of fit of the male and female elements of the connection due to the positioning of this member in this conduit, the stud and the annular part being connected by at least one centering mount.

The invention also relates to a quick connection for an installation handling fluid under pressure which comprises two elements, male and female, and of which at least one is as described hereinabove. Such a connection is more reliable than those of the state of the art.

BRIEF DESCRIPTION OF THE DRAWINGS

The invention will be more readily understood on reading the following description of two forms of embodiment of a connection in accordance with its principle, given solely by way of example and made with reference to the accompanying drawings, in which:

FIG. 1 is an exploded longitudinal section of a female element of a quick connection according to the invention.

FIG. 1A is a side view, in the direction of arrow I in FIG. 1.

FIG. 2 is an exploded view in perspective, with parts torn away, of the element of FIG. 1.

FIG. 2A is a side view, in the direction of arrow II in FIG. 2, of the valve shown in FIGS. 1 and 2.

FIG. 3 is a section of the female element of FIGS. 1 and 2 in configuration of use uncoupled from the corresponding male element of the connection.

FIG. 4 is a section similar to FIG. 3 when a male element is fitted in the female element, and FIG. 5 is a partial section of a female element of a connection, in accordance with a second form of embodiment of the invention and in the configuration of FIG. 3.

DESCRIPTION OF PREFERRED EMBODIMENT

Referring now to the drawings, the female element A of the connection, shown in FIGS. 1 to 4, is intended to receive, fitted in the direction of an axis X–X', a male element B partially shown in FIG. 4.

The element A comprises a body 1 in which is defined a conduit 11 for circulation of fluid under pressure. The body 1 is provided with an internal flange 12 which divides the conduit 11 into three parts 11a, 11b and 11c which successively extend from the rear part 13 of the body 11, intended to be connected to a pipe $C_1$, towards the front part 14 in which is defined the mouth 11d of the conduit 11 through which a tubular part 101 of the male element or connector B may be introduced.

In practice, each of the elements A and B may be connected to a pipe or to a reservoir of fluid under pressure.

The flange 12 is provided with a bevel 12a which forms a tight seat for abutment of a valve 2, of which the external surface includes a truncated part 21 whose geometry is complementary to the bevel 12a.

In practice, the fluid fills the parts 11a and 11b of the conduit 11 when the valve 2 is detached from the seat 12a, while it flows in part 101 of the male connector at the level of part 11c.

According to one aspect of the invention (not shown), the valve 2 may be subjected to the action of means, such as a spring, for elastic return in closed configuration of the element A, i.e. in a configuration where the part 21 bears against the bevel 12a. In the example shown, it is assumed that pipe $C_1$ is connected to a source of fluid under pressure, the pressure $P_1$ prevailing in part 11a of the conduit 11 being sufficient to apply the valve 2 against the seat or bevel 12a by default.

A seal (not shown) is advantageously disposed in the bearing zone between the valve and the seat, this seal being able to be carried by the seat or by the valve.

The valve 2 is provided with two extensions 22 and 23 intended to traverse the part 11b of the conduit 11 and to extend as far as in its part 11c, as will be apparent from the following explanations.

In part 11c of the conduit 11 there is disposed a member 3 which has the function of preventing, as much as possible, an accidental opening of the valve 2, in the sense of opening of the element A. The member 3 is formed by two parts 3A and 3B between which an O-ring 4 is disposed. The part 3A comprises an annular skirt 31 whose external surface 32 has a geometry corresponding to the internal surface 15 of the body 11, of the part 11c of the conduit 11, with the result that this part 3A may be immobilized by cooperation of shapes inside the part 11c. Part 3A also comprises a stud 33 connected to the skirt 31 by a centering mount 34 which extends diametrally with respect to the skirt 31. The geometry of the part 3A is such that, when it is in place in the conduit 11, the stud 33 is centered on axis X–X'.

Part 3B is in the form of an annular sleeve with circular base 35 whose internal and external diameters are identical to those of the skirt 31. The sleeve is provided with an entrance bevel 35a convergent in the direction of part 3A.

When element A is in the configuration of FIG. 3, the extensions 22 and 23 extend right through the mount 34, up to in an annular volume $V_3$ defined by the member 3, between the internal radial cylindrical or annular concave surface 36 of the skirt 31, the O-ring 4 and the internal radial cylindrical or annular concave surface 36' of the sleeve 35, on the one hand, and the external radial surface 37 of the stud 33, on the other hand, these surfaces being cylindrical and of circular base.

Volume $V_3$ is shown shaded grey in FIGS. 1 and 3. It is defined, on its left-hand side in FIG. 1, by an annular transverse section $S_3$ which extends between the surfaces 36' and 37.

In practice, the section $S_3$ and the volume $V_3$ may also be with approximately circular or polygonal, particularly hexagonal or octogonal base. It is also possible that the stud 33 be of non-circular, and even non-cylindrical section. Likewise in these cases, the section $S_3$ and the volume $V_3$ are annular.

$l_3$ denotes the radial width of the section $S_3$ which corresponds to the distance between the surfaces 36' and 37. In the case of section $S_3$ not being strictly annular, $l_3$ is the mean radial width of this section.

When the male element B is being fitted in the female element A, the tubular body 101 of the connector B may be engaged in the body 1, through its mouth 16 made in its front face 17, until it penetrates in the volume $V_3$ through the section $S_3$, as shown in FIG. 4, in which case it may exert on the end surfaces 22a, 23a of the extensions 22 and 23 an effort $F_1$ of moving the valve 2 away with respect to its seat 12a. This allows a flow of the fluid under pressure through the part 11b of the conduit 11 then inside the body 101, as represented by arrows E in FIG. 4.

The male element B is equipped with a closure valve (not shown) of which the pusher 102 then comes into abutment against the end surface 33a of the stud 33 which exerts on this pusher an effort $F_2$ of opening of this valve.

In this configuration, the external radial surface of the part 101 bears against the O-ring 4.

Returning to the configuration of FIG. 3, it will be understood that, if the tip $T_4$ of a tool such as a screwdriver T is introduced in the part 11c of the conduit 11, there is every chance of it striking the stud 33. In effect, the section $S_3$ constitutes a reduced zone of access to the surfaces 22a and 23a. In addition, the tip $T_4$ has every chance of engaging between the extensions 22 and 23 without interacting with the surfaces 22a and 23a.

The surfaces 22a and 23a are the only surfaces on which may be exerted an effort of the type of effort $F_1$ tending to move the valve 2 away from its seat 12a. In other words, an abutment on the stud 33 disposed at the center of the element A does not risk pushing the valve 2 towards an open position, even if the stud 33 is closer to the mouth 16 of the conduit 11 than the surfaces 22a and 23a.

The surface $S_3$ is recessed with respect to the mouth 16 of the element A, by a distance $d_1$ sufficient to prevent an accidental introduction of a standard tool as far as in the volume $V_3$, and even to hinder the visibility of a person attempting to manipulate the valve 2 fraudulently.

When the valve 2 is in abutment on its seat 12a, the surfaces 22a, 23a are recessed in the volume $V_3$, i.e. recessed with respect to the section $S_3$ opposite the mouth 16, by a non-zero distance $d_2$.

Part 3B of the member 3 is not indispensable and such a member may be conceived as being formed by part 3A alone, the latter and/or the O-ring 4 in that case being configured to guide the part 101 during its introduction in the element A. In a variant, the parts 3A and 3B may be in one piece, the O-ring 4 being received in an internal groove of the member 3.

The ratio $R_1 = l_3/d_2$ of the width $l_3$ with respect to the distance $d_2$, is less than 1, preferably less than 0.3, and even than 0.25. In this way, the surfaces 22a and 23a penetrate in the volume $V_3$ deeply with respect to the section $S_3$ through which they are accessible. The risks of accidental or fraudulent manipulation of the valve 2 to open it are thus very substantially reduced.

$A_3$ denotes the area of the section $S_3$. $A_2$ denotes the sum of the areas of the surfaces 22a and 23a. The ratio $R_2 = A_2/A_3$ is strictly less than 1, preferably less than 0.3. In this way, the tip $T_A$ has little chance of interfering with the surfaces 22a and 23a, even if it penetrates as far as in the volume $V_3$.

As is more particularly apparent from FIG. 2A, the extensions 22 and 23 are bevelled in the vicinity of their respective ends, this allowing the ratio $R_2$ to be reduced.

In addition, taking into account the separation of the extensions 22 and 23 which must pass right through the mount 34, the surface of the valve 2 intended to receive the effort $F_1$, which is composed of the reunion of surfaces 22a and 23a, is fractionated, this limiting the surface of accidental interaction with an object.

According to a variant of the invention (not shown), the valve 2 may have one sole extension 22, the ratio $R_2$ being reduced accordingly.

In the second form of embodiment of the invention shown in FIG. 5, elements similar to those of the first have identical references. The body 1 of the female element A defines a conduit 11 for circulation of fluid under pressure in which is disposed a valve 2 provided with two O-rings 24 and 25 for respective abutment on a convex transition zone 12a forming a seat and on a cylindrical central core 33 with curved generatrix. This core belongs to a member 3 on which abuts a spring 5 for returning the valve 2 to a closed configuration. The valve 2 is provided with a central opening 26 allowing it to slide around the stud 33.

An O-ring 4 is disposed in a groove 18 made in the internal radial surface 15b of the downstream part 11b of the conduit 11. This O-ring is intended to bear against a part similar to part 101 shown in FIG. 4.

The member 3 comprises a skirt 31 immobilized by cooperation of shapes against the surface 15a of the upstream part 11a of the conduit 11. Centering mounts (not shown) connect the parts 31 and 33. The stud 33 defines, with the surface 15b a volume $V_3$ in which a plurality of extensions 22 of the valve 2 extend, these extensions being regularly distributed about the central axis X–X' of the element A and separated by interstices.

As previously, the end surface 11a of each extension 22 is intended to receive an effort $F_1$ of the type of the effort of displacement of the valve 2 in a sense of opening allowing fluid under pressure to flow through the conduit 11.

The surfaces 22a of the extensions 22 are disposed in an annular volume $V_3$ accessible through an annular transverse section $S_3$ defined around the end 33a of the stud 33. This end is flared, with the result that the radial width $l_3$ of the section $S_3$ is less than the width of the volume $V_3$ at the height of the ends 22a and this, all the more so as the surface 15b is provided with a radial groove 15c which locally increases the width of the volume $V_3$. An object introduced through the section $S_3$ therefore has all the less chance of striking one of the ends 22a.

As previously, the ratios $R_1$ and $R_2$ are less than 1, preferably less than 0.3.

The invention has been shown with a quick connection of which the male element and the female element each comprise a closure valve. However, it is applicable with a quick connection of which only the female element is provided with such a valve.

What is claimed is:

1. A male or female element of a safety quick connection for removably joining pipes and/or reservoirs of fluid under pressure, one of said elements including a closure valve adapted to be moved to an open position by the other element of the connection, while, when said valve is in abutment and in a closed position against a seat, at least one surface of said valve, adapted to be engaged by a part of said other element, is recessed with respect to an open annular transverse section $S_3$ through which said part of said other element is received for opening the valve and wherein a ratio of a mean width $l_3$ of said open annular transverse section $S_3$, taken in a radial direction with respect to an axis of fit of said male and female elements, and of a depth of recess $d_2$ of said at least one surface from said open annular transverse section $S_3$, is less than 1.

2. The element of claim 1, wherein the at least one surface of said valve adapted to be engaged by said part of said other element is constituted by at least two portions separated from one another, such that they form a discontinuous bearing surface.

3. The element of claim 1, wherein, when said valve is in abutment on its seat in said closed position, said at least one surface is disposed in an annular volume $V_3$, inside said one of said elements and of which said open annular transverse section $S_3$ constitutes an entrance.

4. The element of claim 1, wherein said open annular transverse section $S_3$ is defined between a central stud whose median axis is substantially parallel to the axis of fit of said elements and an outer cylindrical concave surface.

5. The element of claim 1, wherein a ratio of an area of said at least one surface of said valve and of an area of said open annular transverse section $S_3$ is less than 1.

6. The element of claim 1, wherein said open annular transverse section $S_3$ is formed in said body spaced from a mouth of said one element.

7. The element of claim 6, wherein said open annular transverse section $S_3$ is defined, at least in part, by a member added in a conduit located between said valve and the mouth of said one element.

8. The element of claim 1, wherein said open annular transverse section $S_3$ is defined, at least in part, by a member which extends both upstream and downstream of said valve, and said valve is provided with an opening in which a part of said member is introduced.

9. The element of claim. 7, wherein said member includes an annular part adapted to come into abutment against an internal surface of said body of said one element defining said conduit, a stud adapted to be centered on the axis of fit of said male and female elements due to a positioning of said member in said conduit, and said stud and said annular part being connected by at least one centering mount.

10. The element of claim 1, wherein the ratio of the mean width $l_3$ of said open annular transverse section $S_3$, taken in a radial direction with respect to an axis of fit of said male and female elements, and of the depth of recess $d_2$ of said at least one surface from said open annular transverse section $S_3$, is less than 0.3.

11. The element of claim 5, wherein the ratio of the area of said at least one surface of said valve and of the area of said open annular transverse section $S_3$ is less than 0.3.

12. A quick coupling connection for an installation handling fluid under pressure comprising male and female elements, fixed to ends of two portions of pipes and/or reservoirs and adapted to fit axially within one another, wherein one of said elements including a closure valve adapted to be moved to an open position by the other element of the connection, while, when said valve is in abutment and in a closed position against a seat, at least one surface of said valve, adapted to be engaged by a part of said other element, is recessed with respect to an open annular transverse section $S_3$ through which said part of said other element is received for opening the valve, and wherein a ratio of a mean width $l_3$ of said open annular transverse section $S_3$, taken in a radial direction with respect to an axis of fit of said male and female elements, and of a depth of recess $d_2$ of said at least one surface from said open annular transverse section $S_3$, is less than 1.

13. The quick coupling connection of claim 12, wherein the ratio of the mean width $l_3$ of said open annular transverse section $S_3$, taken in a radial direction with respect to an axis of fit of said male and female elements, and of the depth of recess $d_2$ of said at least one surface from said open annular transverse section $S_3$, is less than 0.3.

14. The quick coupling connection of claim 12, wherein a ratio of an area of said at least one surface of said valve and of an area of said open annular transverse section $S_3$ is less than 1.

15. The quick coupling connection of claim 14 wherein the ratio of the area of said at least one surface of said valve and of the area of said open annular transverse section $S_3$ is less than 0.3.

* * * * *